US009680336B2

(12) United States Patent
Bae

(10) Patent No.: US 9,680,336 B2
(45) Date of Patent: Jun. 13, 2017

(54) WIRELESS POWER REPEATER AND METHOD THEREOF

(75) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 593 days.

(21) Appl. No.: 14/343,702

(22) PCT Filed: Jul. 13, 2012

(86) PCT No.: PCT/KR2012/005590

§ 371 (c)(1), (2), (4) Date: Mar. 7, 2014

(87) PCT Pub. No.: WO2013/035978

PCT Pub. Date: Mar. 14, 2013

(65) Prior Publication Data

US 2014/0203662 A1 Jul. 24, 2014

(30) Foreign Application Priority Data

Sep. 9, 2011 (KR) ........................ 10-2011-0092013

(51) Int. Cl.

*H02J 17/00* (2006.01)
*H04B 5/00* (2006.01)
*H02J 50/12* (2016.01)

(52) U.S. Cl.

CPC .............. *H02J 17/00* (2013.01); *H02J 50/12* (2016.02); *H04B 5/0037* (2013.01); *H04B 5/0075* (2013.01)

(58) Field of Classification Search

CPC .. B60L 5/005; B60L 11/1809; B60L 11/1811; B60L 11/1812; B60L 11/182;

(Continued)

(56) References Cited

U.S. PATENT DOCUMENTS 8,878,393 B2 * 11/2014 Kirby ............................ 307/104
2009/0096413 A1 4/2009 Partovi et al.

(Continued)

FOREIGN PATENT DOCUMENTS

JP 2011-151946 A 8/2010
JP 2010-527226 A 12/2010

(Continued)

OTHER PUBLICATIONS

International Search Report in International Application No. PCT/KR2012/005590, filed Jul. 13, 2012.

*Primary Examiner* — Levi Gannon
(74) *Attorney, Agent, or Firm* — Saliwanchik, Lloyd & Eisenschenk

(57) ABSTRACT

Disclosed is a wireless power transmission apparatus to wirelessly transmit power to a wireless power receiving apparatus by using resonance. The wireless power transmission apparatus includes a transmission part including a transmission coil to receive the power from a power supply to generate a magnetic field, a transmission resonance coil to transmit power received therein from the transmission coil, and a plurality of repeating coils placed in the transmission resonance coil to repeat the power, a detection part to detect a position of the wireless power receiving apparatus placed on the transmission part, and a controller to determine a repeating coil corresponding to the position of the wireless power receiving apparatus and perform a control operation to transmit power through the repeating coil.

19 Claims, 3 Drawing Sheets

(58) Field of Classification Search
CPC .. B60L 11/1829; B60L 11/1831; H01F 38/14; H02J 5/00; H02J 5/005; H02J 7/025; H02J 17/00; H02J 50/00; H02J 50/10; H02J 50/12; H04B 5/0037; H04B 5/0075; H04B 5/0081; H04B 5/0087; H04B 5/0093; Y02T 10/7005; Y02T 10/7072; Y02T 10/725; Y02T 90/10; Y02T 90/122
USPC .......................................................... 307/104
See application file for complete search history.

(56) References Cited

U.S. PATENT DOCUMENTS

2009/0284082 A1 11/2009 Mohammadian
2009/0284227 A1* 11/2009 Mohammadian .... G06K 7/0008 320/137
2011/0115430 A1* 5/2011 Saunamaki ............. H02J 5/005 320/108
2011/0175455 A1* 7/2011 Hashiguchi ............. H02J 17/00 307/104
2012/0032522 A1* 2/2012 Schatz .................... H02J 5/005 307/104
2012/0286582 A1* 11/2012 Kim ........................ H02J 5/005 307/104

FOREIGN PATENT DOCUMENTS

KR 10-2011-0014642 A 2/2011
KR 10-2010-0128395 A 8/2011

* cited by examiner

WIRELESS POWER REPEATER AND METHOD THEREOF

CROSS-REFERENCE TO RELATED APPLICATIONS

This application is the U.S. national stage application of International Patent Application No. PCT/KR2012/005590, filed Jul. 13, 2012, which claims priority to Korean Application No. 10-2011-0092013, filed Sep. 9, 2011, the disclosures of each of which are incorporated herein by reference in their entirety.

TECHNICAL FIELD

The disclosure relates to a wireless power transmission technology. In more particular, the disclosure relates to a wireless power repeater for concentrating wireless power, which is transmitted from a wireless power transmitter, in a specific direction and a method thereof.

BACKGROUND ART

A wireless power transmission or a wireless energy transfer refers to a technology for wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. Until now, the long-distance transmission using the magnetic induction, the resonance and the short-wavelength radio frequency has been used as the wireless energy transfer scheme.

In the case of a short-distance wireless power transmission, which has been spotlighted in these days, a wireless power transmitter is installed in a building in such a manner that a mobile device, such as a cellular phone or a notebook computer, can be continuously charged when a user uses the mobile device in the building even if the mobile device is not connected to an additional power cable.

However, in the above wireless power transmission technologies, a coupling coefficient between a wireless power transmitter and a wireless power receiver must be equal to or higher than the critical value in order to effectively perform the wireless power transmission using resonance. At this time, the coupling coefficient may be determined depending on the size of a transmission resonant coil of the transmitter and a receiving resonant coil of the receiver and the distance between the transmitter and the receiver.

In general, the size of the receiving resonant coil is significantly smaller than the size of the transmission resonant coil, so the coupling coefficient between the transmission resonant coil and the receiving resonant coil is very small. Accordingly, energy transmission efficiency can be reduced due to the resonance between the transmission apparatus and the receiving apparatus.

Accordingly, a scheme of effectively transferring energy from a wireless power transmission apparatus to a wireless power receiving apparatus has been required.

DISCLOSURE OF INVENTION

Technical Problem

The disclosure provides a wireless power transmission apparatus capable of transferring energy by using a resonance phenomenon.

In addition, the disclosure provides a wireless power transmission apparatus capable of transferring energy based on the position of the wireless power receiving apparatus and a method thereof.

Further, the disclosure provides a wireless power transmission apparatus capable of transferring energy by individually controlling capacitors of a plurality of repeating coils and a method thereof.

Solution to Problem

According to one embodiment of the disclosure, there is provided a wireless power transmission apparatus to wirelessly transmit power to a wireless power receiving apparatus by using resonance. The wireless power transmission apparatus includes a transmission part including a transmission coil to receive the power from a power supply to generate a magnetic field, a transmission resonance coil to transmit power received therein from the transmission coil, and a plurality of repeating coils placed in the transmission resonance coil to repeat the power, a detection part to detect a position of the wireless power receiving apparatus placed on the transmission part, and a controller to determine a repeating coil corresponding to the position of the wireless power receiving apparatus and perform a control operation to transmit power through the repeating coil.

According to another embodiment of the disclosure, there is provided a wireless power transmission apparatus to wirelessly transmit power to a wireless power receiving apparatus by using resonance. The wireless power transmission apparatus includes a transmission part including a transmission coil to receive the power from a power supply to generate a magnetic field, a transmission resonance coil to transmit power received therein from the transmission coil, and a plurality of repeating coils placed in the transmission resonance coil to repeat the power, a detection part to detect a position of the wireless power receiving apparatus placed on the transmission part, and a controller to adjust an impedance of the repeating coil according to the position of the wireless power receiving apparatus.

According to still another embodiment of the disclosure, there is provided a method of wirelessly transmitting power by a wireless power transmission apparatus including a plurality of repeating coils to wirelessly transmit the power to a wireless power receiving apparatus using resonance. The method includes measuring variation in a quantity of an internal current of the wireless power transmission apparatus and detecting a position of the wireless power receiving apparatus placed on the wireless power transmission apparatus based on the measured quantity of the internal current, determining a repeating coil corresponding to the position of the wireless power receiving apparatus, and transmitting the power through the determined repeating coil.

Advantageous Effects of Invention

As described above, according to the embodiment of the disclosure, the wireless power transmission apparatus transfers energy through a repeating coil corresponding to the position of the wireless power receiving apparatus, so that the energy transfer efficiency to the wireless power receiving apparatus can be improved.

In addition, the wireless power transmission apparatus concentrates on the energy transfer to the wireless power receiving apparatus by using a specific repeating coil. Accordingly, energy consumption can be reduced, and the magnetic field harmful to a human body can be reduced.

Meanwhile, other various effects may be directly or indirectly disclosed in the following description of the embodiment of the disclosure.

BEST MODE FOR CARRYING OUT THE INVENTION

Hereinafter, exemplary embodiments of the disclosure will be described in detail so that those skilled in the art can easily comprehend the disclosure.

Figure 1:
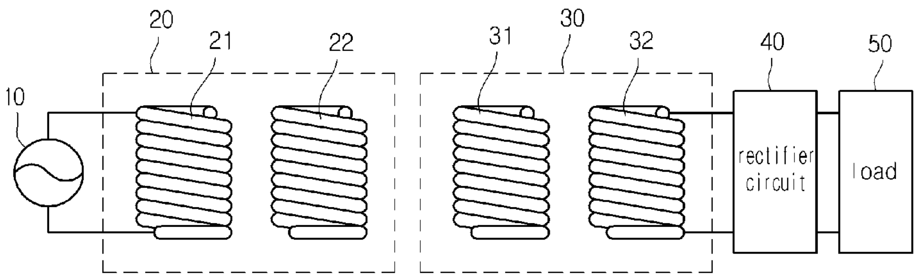
FIG. 1 is a view showing a wireless power transmission system according to one embodiment of the disclosure.

FIG. 1 is a view showing a wireless power transmission system according to one embodiment of the disclosure.

FIG. 1 illustrates the wireless power transmission system according to one embodiment of the disclosure.

Referring to FIG. 1, the wireless power transmission system may include a power source 10, a power transmitter 20, a power receiver 30, a rectifier circuit 40, and a load 50.

Power generated from the power source 10 is transmitted to the power transmitter 20 and then transmitted to the power receiver 30 that makes resonance with the power transmitter 20 using resonance, that is, has a resonant frequency value equal to that of the power transmitter 20. The power transmitted to the power receiver 30 is transmitted to the load 50 through the rectifier circuit 40. The load 50 may be a battery or a device requiring the power.

In more detail, the power source 10 is an AC power source to provide AC power having a predetermined frequency.

The power transmitter 20 includes a transmission coil 21 and a transmission resonant coil 22. The transmission coil 21 is connected to the power source 10 and AC current flows through the transmission coil 21. As the AC current flows through the transmission coil 21, the AC current is induced to the transmission resonant coil 22, which is physically spaced apart from the transmission coil 21, through the electromagnetic induction. The power transmitted to the transmission resonant coil 22 is transmitted to the power receiver 30, which forms a resonant circuit together with the power transmitter 10 by resonance.

According to the power transmission using resonance, the power can be transmitted between two LC circuits which are impedance-matched. The power transmission using the resonance can transmit the power farther than the power transmission using the electromagnetic induction with the high power transmission efficiency.

The power receiver 30 includes a receiving resonant coil 31 and a receiving coil 32. The power transmitted through the transmission resonant coil 22 is received in the receiving resonant coil 31 so that the AC current is applied to the receiving resonant coil 31. The power transmitted to the receiving resonant coil 31 is transmitted to the receiving coil 32 through the electromagnetic induction. The power transmitted to the receiving coil 32 is rectified through the rectifier circuit 40 and then transmitted to the load 50.

Figure 2:
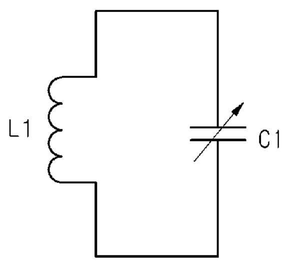
FIG. 2 is a circuit diagram showing an equivalent circuit of a transmission coil part according to one embodiment of the disclosure.

FIG. 2 shows the equivalent circuit of the transmission coil 21 according to one embodiment. As shown in FIG. 2, the transmission coil 21 may include an inductor L1 and a capacitor C1 and a circuit having predetermined inductance and capacitance values can be formed by using the inductor L1 and the capacitor C1.

The capacitor C1 may include a fixed capacitor or a variable capacitor. If the capacitor C1 is a variable capacitor, the power transmitter 20 may perform impedance matching by adjusting the variable capacitor. The equivalent circuit of the transmission resonance coil 22, the receiving resonant coil 31 and the receiving coil 22 may the same as the equivalent circuit shown in FIG. 2.

Figure 3:
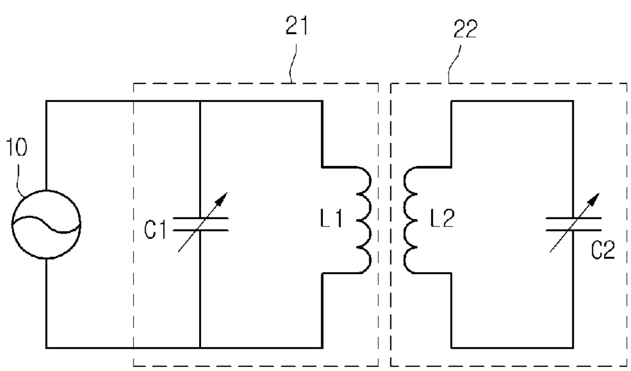
FIG. 3 is a circuit diagram showing an equivalent circuit of a power source and a transmission part according to one embodiment of the disclosure.

FIG. 3 is a view showing an equivalent circuit of the power source 10 and the power transmitter 20 according to one embodiment of the disclosure. As shown in FIG. 3, the transmission coil 21 and the transmission resonant coil 22 may include inductors L1 and L2 having predetermined inductance values and capacitors C1 and C2 having predetermined capacitance values, respectively.

In particular, the capacitor C2 of the transmission resonance coil 22 may include a variable capacitor. The power transmitter 20 may adjust a resonance frequency value for the resonance by adjusting the variable capacitor.

Figure 4:
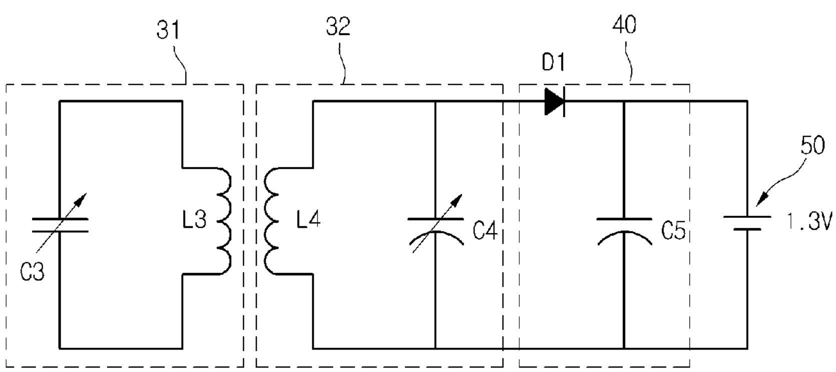
FIG. 4 is a circuit diagram showing an equivalent circuit of a receiving resonance coil part, a receiving coil part, a rectifying circuit, and a load according to one embodiment of the disclosure.

FIG. 4 is a view showing an equivalent circuit of the receiving resonant coil 31, the receiving coil 32, the rectifier circuit 40 and the load 50. As shown in FIG. 4, the receiving resonance coil 31 and the receiving coil 32 may include inductors L3 and L4 having predetermined inductance values and capacitors C3 and C4 having predetermined capacitance values.

The rectifier circuit 40 may include a diode D1 and a smoothing capacitor C5, and converts AC power into DC power to be output. Although the load 50 is shown as a DC power source of 1.3V, the load 50 may be a battery or a device requiring the DC power.

Meanwhile, the wireless power transmission apparatus and the method thereof, in which a wireless power repeating technology is applied to the wireless power transmission system, will be described below according to the embodiment of the disclosure.

The transmission coil 21 is inductive-coupled with the transmission resonance coil 22. In other words, as AC current flows through the transmission coil 21 by the power supplied from the power source 10, the AC current is induced to the transmission resonant coil 22, which is physically spaced apart from the transmission coil 21, through the electromagnetic induction.

In more detail, the transmission resonance coil 22 is resonance-coupled with the receiving resonance coil 31 so that the transmission resonance coil 22 and the receiving resonance coil 31 operate at the resonance frequency.

The resonance coupling between the transmission resonance coil 22 and the receiving resonance coil 31 can greatly improve the power transmission efficiency between the power transmitter 20 and the power receiver 30.

The power transmitter 20 may act as a wireless power transmission apparatus, and the power receiver 30 may act as a wireless power receiving apparatus.

A quality factor and a coupling coefficient are important in the wireless power transmission.

The quality factor may refer to an index of energy that may be stored in the vicinity of a wireless power transmission apparatus or a wireless power receiving apparatus.

The quality factor may be varied according to the operating frequency w, a coil shape, a dimension, and a material. The quality factor may be expressed in equation, Q=w*L/R. In Equation, L refers to the inductance of a coil, and R refers to resistance corresponding to the quantity of power loss caused in the coil.

The quality factor may have a value of 0 to infinity.

The coupling coefficient represents the degree of inductive coupling between a transmission coil and a receiving coil, and has a value of 0 to 1.

The coupling coefficient may be varied according to the relative position and the distance between the transmission coil and the receiving coil.

Figure 5:
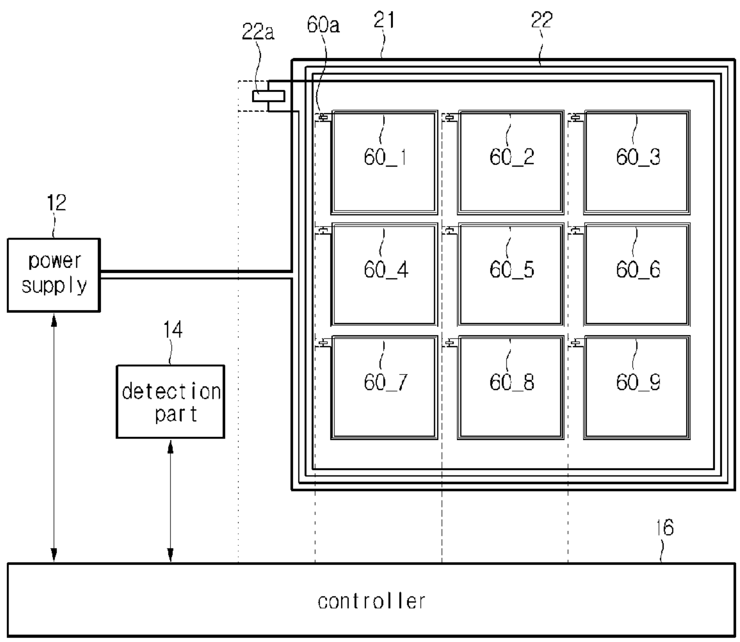
FIG. 5 is a block diagram showing the wireless power transmission system according to one embodiment of the disclosure.

FIG. 5 is a view showing the wireless power transmission apparatus according to one embodiment of the disclosure.

Referring to FIG. 5, the wireless power transmission apparatus includes a power supply 12, a detection part 14, a controller 16, the transmission coil 21, the transmission resonance coil 22, and a plurality of repeating coils 60. Meanwhile, as shown in FIG. 5, the remaining components except for the transmission coil 21, the transmission resonance coil 22, and the repeating coils 60 may constitute the power source 10 of FIG. 1.

The transmission coil 21, the transmission resonance coil 22, and the repeating coils 60 of the wireless power transmission apparatus are integrally formed with each other to constitute a transmission pad.

The transmission pad includes the transmission coil 21 having a rectangular winding form at the outer most part of the transmission pad, the transmission resonance coil 22 having the winding form the same as the above rectangular winding form in the transmission coil 21, and the repeating coils 60 regularly arranged in the transmission resonance coil 22. Meanwhile, although the transmission pad has the rectangular form according to the present embodiment, the disclosure is not limited thereto.

If the wireless power receiving apparatus is placed on the transmission pad, the wireless power transmission apparatus transfers energy to the wireless power receiving apparatus through the transmission resonance coil and the repeating coils of the transmission pad.

The power supply 12 generates AC power having a specific frequency and provides the related power to the transmission pad.

The transmission coil 21 is connected to the power supply 12, and AC current flows through the inner part of the transmission coil 21 to generate a magnetic field. In addition, the transmission coil 21 transfers the magnetic field to the transmission resonance coil 22 physically spaced apart from the transmission coil 21 based on electromagnetic induction.

If the transmission resonance coil 22 receives the magnetic field from the transmission coil 21, AC current is induced into the transmission resonance coil 22. In addition, the transmission resonance coil 22 supplies the energy stored therein to the wireless power receiving apparatus or the repeating coils 60 by the resonance phenomenon. Meanwhile, for the wireless power transmission based on the resonance phenomenon, the resonance frequency of the transmission resonance coil 22 must be matched with the resonance frequency of the receiving resonance coil (not shown) or the resonance frequency of the repeating coils 60.

The transmission resonance coil 22 includes a capacitor **22*a*. The capacitor 22*a* may include a fixed capacitor or a variable capacitor. If the capacitor 22*a* is the variable capacitor, the controller 16 may adjust the resonance frequency value for the resonance through the capacitor 22*a* of the transmission resonance coil 22**.

For example, the wireless power receiving apparatus has a fixed resonance frequency value by using a fixed inductance value and a fixed capacitance value. In order to transfer the energy to the wireless power receiving apparatus by the resonance, the wireless power transmission apparatus adjusts the variable capacitor **22*a* of the transmission resonance coil 22 so that the wireless power transmission apparatus has a resonance frequency equal to that of the wireless power receiving apparatus. In this case, the controller 16** may previously store the information of the resonance frequency of the wireless power receiving apparatus.

The wireless power transmission apparatus generates AC power having the resonance frequency equal to the resonance frequency of the wireless power receiving apparatus and the resonance frequency of the transmission resonance coil to transfer energy by the resonance.

The repeating coils 60 may be arranged in the form of a lattice or a matrix inside the transmission coil 21 and the transmission resonance coil 22. In other words, the repeating coils 60 may be provided in such a manner that the repeating coils 60 divide the region of the transmission pad into a plurality of uniform regions.

In addition, the repeating coils 60 may have the same size and the same shape, and the disclosure is not limited thereto. Meanwhile, although the repeating coils 60 include the nine repeating coils 60_1 to 60_9, which are arranged in the form of a lattice according to the present embodiment, in total, the disclosure is not limited thereto.

The repeating coils 60 repeat the energy received therein from the transmission resonance coil 22 by resonance to the wireless power receiving apparatus.

Preferably, the repeating coils 60 have a size greater than that of the receiving resonance coil of the wireless power receiving apparatus. In other words, the radius of the repeating coils 60 may be greater than the radius of the receiving resonance coil. This is because the coupling coefficient exceeding a critical value must be made between the transmission resonance coil and the receiving resonance coil in order to effectively perform the wireless power transmission. Accordingly, the energy transmission scheme based on the repeating coils 60 more improves the transmission efficiency as compared with a scheme of directly transferring energy from the wireless power transmission apparatus to the wireless power receiving apparatus.

Further, the repeating coils 60 can be controlled so that only a specific repeating coil operates according to the position of the wireless power receiving apparatus on the transmission pad. The repeating coils 60 include capacitors **60*a*, respectively, and each capacitor 60*a* is connected to the controller 16 of the wireless power transmission apparatus. In this case, each capacitor 60*a*** may include a fixed capacitor or the variable capacitor.

If the capacitors of the repeating coils 60 are variable capacitors, the controller 16 adjusts the variable capacitor of the repeating coil 60 corresponding to the positions of the wireless power receiving apparatus, so that the repeating coil 60 has the same resonance frequency as that of the transmission resonance coil and the receiving resonance coil. In this case, the repeating coil corresponding to the position of the wireless power receiving apparatus refers to a repeating coil placed below a region of the transmission pad in which the wireless power receiving apparatus is positioned.

Figure 6:
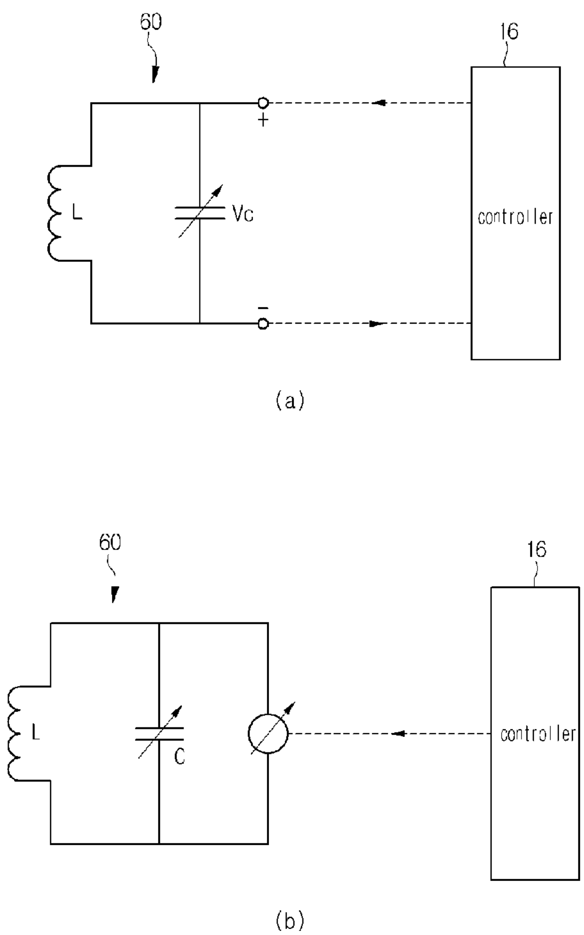
FIG. 6 is a view showing a method of controlling a plurality of repeating coil parts according to one embodiment of the disclosure.

For example, as shown in FIG. 6(*a*), the controller 16 can adjust the value of the variable capacitor by changing a voltage value Vc applied to both terminals of the variable capacitor.

At the same time, the controller 16 adjusts variable capacitors of remaining repeating coils except for the related repeating coil, that is, variable capacitors of repeating coils, which do not correspond to the position of the wireless power receiving apparatus, so that the remaining repeating coils 60 have resonance frequencies different from the resonance frequency of the transmission resonance coil and the receiving resonance coil.

The repeating coil 60, which corresponds to the position of the wireless power receiving apparatus, transfers energy due to the resonance between the transmission resonance coil and the receiving resonance coil under the control of the controller 16. In contrast, the repeating coils, which do not correspond to the position of the wireless power receiving apparatus, do not transfer energy due to the resonance.

Accordingly, the wireless power transmission apparatus can concentrate on energy transfer to the wireless power receiving apparatus through the repeating coil 60 corresponding to the position of the wireless power receiving apparatus.

Meanwhile, if the capacitors of the repeating coils 60 are fixed capacitors, the controller 16 individually controls the repeating coils 60 through switches parallel-connected to both terminals of the fixed capacitor of the repeating coils 60. In this case, the fixed capacitor may be preset to have a resonance frequency equal to the resonance frequency of the transmission resonance coil and the receiving resonance coil.

For example, as shown in FIG. 6(*b*), if the controller 16 opens the switch placed at both terminals of the fixed capacitor of the repeating coil corresponding to the position of the wireless power receiving apparatus, the wireless power transmission apparatus may transfer energy due to the resonance through the repeating coil At the same time, if the controller 16 shorts a switch placed at both terminals of the fixed capacitor of the repeating coil which does not correspond to the position of the wireless power receiving apparatus, the wireless power transmission apparatus cannot transfer energy due to the resonance through the repeating coil.

Under the control of the controller 16, the repeating coil 60 corresponding to the position of the wireless power receiving apparatus transfers energy due to the resonance between the transmit resonance coil 22 and the receiving resonance coil. In contrast, the repeating coils 60, which do not correspond to the position of the wireless power receiving apparatus, do no transfer energy due to the resonance.

Therefore, the wireless power transmission apparatus can concentrate on energy transfer to the wireless power receiving apparatus through the repeating coil corresponding to the position of the wireless power receiving apparatus.

The detection part 14 detects the variation of the internal current of the wireless power transmission apparatus, and provides the information of the current variation to the controller 16. Then, the controller 16 detects the position of the wireless power receiving apparatus based on the information of the current variation received therein from the detection part 14.

In this case, the controller 16 detects the position of the wireless power receiving apparatus while sequentially controlling the repeating coils 60 one by one. For example, the controller 16 determines if the wireless power receiving apparatus is placed on the region of the transmission pad, in which the related repeating coil is positioned, by sequentially adjusting variable capacitors 60*a* of the first to ninth repeating coils 60_1 to 60_9.

In more detail, the controller 16 adjusts the variable capacitor of the first repeating coil 60_1 so that the first repeating coil 60_1 has the resonance frequency identical to the resonance frequency of the transmission resonance coil and the receiving resonance coil. At this time, the controller 16 adjusts variable capacitors of the remaining repeating coils 60_2 to 60_9 so that the remaining repeating coils 60_2 to 60_9 have resonance frequencies different from the resonance frequency of the transmission resonance coil and the receiving resonance coil.

If the wireless power receiving apparatus is placed on the region of the transmission pad in which the first repeating coil 60_1 is positioned, the wireless power transmission occurs due to the resonance between the first repeating coil 60_1 and the wireless power receiving apparatus.

If the wireless power transmission occurs, the quantity of energy stored in the transmission resonance coil 22 of the wireless power transmission apparatus is reduced, so that the quantity of current detected in the wireless power transmission apparatus is reduced. If the controller 16 receives the information of the variation in the quantity of current from the detection part 14, the controller 16 recognizes the existence of the wireless power receiving apparatus on the region of the transmission pad in which the first repeating coil 60_1 is positioned.

In addition, if the wireless power receiving apparatus does not exist on the region of the transmission pad in which the first repeating coil 60_1 is positioned, the wireless power transmission does not directly occur between the first repeating coil 60_1 and the wireless power receiving apparatus.

In this case, the variation in the quantity of current detected in the wireless power transmission apparatus may not greatly occur. If the controller 16 receives the information of the variation in the quantity of the current from the detection part 14, the controller 16 recognizes that the wireless power receiving apparatus does not exist on the region of the transmission pad in which the first repeating coil 60_1 is positioned.

The controller 16 recognizes the existence of the wireless power receiving apparatus on the region of the transmission pad in which the related repeating coil is positioned by sequentially performing the above processes with respect to the remaining repeating coils. In this case, the controller 16 can detect the positions of the wireless power receiving apparatus at a preset time interval.

If the position of the wireless power receiving apparatus has been completely detected, the controller 16 transfers energy through the repeating coil corresponding to the position of the wireless power receiving apparatus.

In other words, the controller 16 adjusts the variable capacitor of the related repeating coil in such a manner that the resonance frequency of the related repeating coil is identical to the resonance frequency of the transmission resonance coil and the receiving resonance coil, and adjusts variable capacitors of the remaining repeating coils in such a manner that the resonance frequencies of the remaining repeating coils are different from the resonance frequency of the transmission resonance coil and the receiving resonance coil.

Thereafter, the wireless power transmission apparatus generates AC power having the resonance frequency equal to the resonance frequency of the wireless power receiving apparatus to transfer energy through the repeating coil corresponding to the position of the wireless power receiving apparatus.

Hereinafter, a method of detecting the position of the wireless power receiving apparatus according to the embodiment will be described with reference to accompanying drawings. Meanwhile, although the wireless power transmission apparatus detects the position of the wireless power receiving apparatus through the variation in the quantity of current according to the present embodiment, the disclosure is not limited thereto. In other words, the wireless power transmission apparatus may use a method of detecting the position of the wireless power receiving apparatus by using a pressure sensor instead of the method of detecting the position of the wireless power receiving apparatus by using the variation in the quantity of current.

The wireless power transmission apparatus further includes a position detection part (not shown), and may detect the position of the wireless power receiving apparatus by using a position discerning part.

The position detection part can detect the position of the wireless power receiving apparatus by using a real time locating system (RTLS).

The RTLS employs various localization schemes, and representative localization schemes include a triangulation-AOA (Angle of Arrival) scheme, a trilateration-RSS (Received Signal Strength) scheme, a TOA (Time of Arrival) scheme, a hyperbola-TDOA (Time Difference Of Arrival) scheme.

The RTLS requires a tag used to transmit the self information of the RTLS with a predetermined period of time and a device used to receive predetermined information from the tag. In this case, in order to exactly detect the position of the tag, at least three pieces of information of the distance from the tag is required. Therefore, at least three devices are required to receive the information transmitted from the tag.

According to the present embodiment, the wireless power receiving apparatus may include a tag having an intrinsic ID. In addition, in order to exactly detect the position of the wireless power receiving apparatus including the tag, at least three repeating coils are required around the wireless power receiving apparatus. In this case, wired and/or wireless communication is made between the repeating coils.

Under this environment, the position detection part can receive a message transmitted from the wireless power receiving apparatus with a predetermined period of time, and can obtain the information of the distance from the wireless power receiving apparatus. In addition, the position detection part can acquire the information of the distance from the wireless power receiving apparatus from the adjacent repeating coil.

Figure 7:
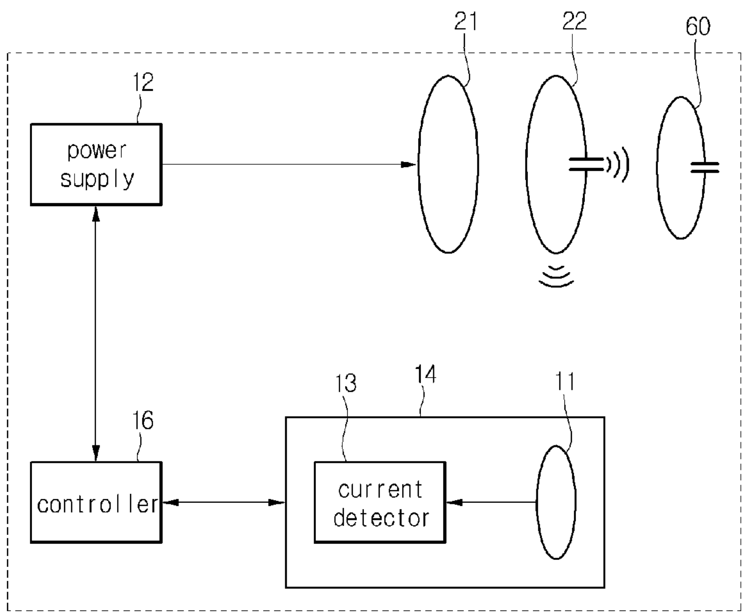
FIG. 7 is a view showing a detection part according to one embodiment of the disclosure.

The position detection part can exactly detect the position of the wireless power receiving apparatus by using the information of the position of the position detection part, the information of the position of the adjacent repeating coil, and the above plural pieces of information. FIG. 7 is a view showing the detection part according to one embodiment of the disclosure.

Referring to FIG. 7, the detection part 14 includes a detection coil 11 and a current detector 13.

The detection coil 11 can detect the intensity of a magnetic field transmitted from the transmission resonance coil 22 or the repeating coil 60. Meanwhile, according to the present embodiment, the detection coil 11 detects the intensity of the magnetic field generated from the transmission resonance coil 22.

The current detector 13 converts power generated by the magnetic field detected by the detection coil 11 into current to detect the variation in the quantity of the current. In addition, the current detector 13 provides the information of the variation in the quantity of the current to the controller 16.

In this case, a principle in which the controller 16 detects the position of the wireless power receiving apparatus based on the variation in the quantity of current is as follows.

As shown in FIG. 7, the transmission resonance coil 22 and the repeating coil 60 store power based on resonance. In this case, the quantity of energy stored by the transmission resonance coil 22 and the repeating coils 60 is expressed in equation, "input power×Q (quality factor)". In addition, the Q value between the transmission resonance coil 22 and the repeating coil 60 is lowered as the power, which is received by the receiving apparatus as the receiving apparatus approaches the transmission apparatus, is increased.

In addition, since the magnetic force generated from the transmission resonance coil 22 and the repeating coil 60 is proportion to the energy stored therein, the quantity of energy stored in the transmission resonance coil 22 and the repeating coil 60 is reduced as the receiving apparatus approaches the transmission apparatus. Therefore, the quantity of the magnetic field generated from the transmission resonance coil 22 and the repeating coil 60 is weakened, and the quantity of power detected by the detection coil 11 is reduced.

In other words, as the receiving apparatus approaches the transmitting apparatus, the current value detected in the current detector 13 is gradually decreased. The controller 16 can detect the position of the wireless power receiving apparatus placed on the transmission pad based on the variation in the quantity of the current.

Meanwhile, the current detector 13 may previously store a reference current value used to detect the existence of the wireless power receiving apparatus. In this case, the reference current value may be preset based on the value of current flowing through the inner part of the wireless power transmission apparatus when the wireless power receiving apparatus is not placed on the transmission pad.

The current detector 13 detects the variation in the quantity of current of the wireless power transmission apparatus by using the value of the current detected by the detection coil 11 and the reference current value. In addition, the current detector 13 provides the information of the variation in the quantity of the current to the controller 16.

The controller 16 sequentially controls the repeating coils 60 while monitoring the information of the variation in the quantity of the current provided by the detection part 14. In addition, the controller 16 detects the position of the wireless power receiving apparatus placed on the transmission pad based on the information of the variation in the quantity of the current.

In addition, the controller 16 needs to preset a critical value used to determine regions, in which the wireless power receiving apparatus is positioned, among a plurality of regions corresponding to the repeating coils 60. If the wireless power receiving apparatus is positioned on a plurality of regions while overlapping with the regions, the variation in the quantity of current is detected from all repeating coils of the regions.

Therefore, the controller 16 may determine a repeating coil positioned at a region most significantly overlapping with of the wireless power receiving apparatus by setting the critical value. Therefore, the controller 16 can determine that the wireless power receiving apparatus is positioned on the related repeating coil only if the variation in the quantity of current provided by the detection part 14 exceeds the preset set value.

Meanwhile, although the detection of the wireless power receiving apparatus is performed by the controller 16 based on the variation in the quantity of the current according to the present embodiment, the disclosure is not limited thereto, but the detection of the wireless power receiving apparatus may be performed by the detection part 14.

If the position of the wireless power receiving apparatus has been completely detected, the controller 16 can transfer energy through the repeating coil corresponding to the position of the wireless power receiving apparatus.

In other words, the controller 16 adjusts the variable capacitor of the related repeating coil in such a manner that the resonance frequency of the related repeating coil is equal to the resonance frequency of the transmission resonance coil and the receiving resonance coil, and adjusts variable capacitors of the remaining repeating coils in such a manner that the resonance frequencies of the remaining repeating coils are different from the resonance frequency of the transmission resonance coil and the receiving resonance coil.

Thereafter, the wireless power transmission apparatus generates AC power having the resonance frequency equal to the resonance frequency of the wireless power receiving apparatus to transfer energy through the repeating coil corresponding to the position of the wireless power receiving apparatus.

As described above, the wireless power transmission apparatus according to the embodiment of the disclosure transfers energy through the coil part corresponding to the position of the wireless power receiving apparatus placed on the transmission pad, thereby improving the transfer efficiency of energy to the wireless power receiving apparatus.

Although a preferred embodiment of the disclosure has been described for illustrative purposes, those skilled in the art will appreciate that various modifications, additions and substitutions are possible, without departing from the scope and spirit of the invention as disclosed in the accompanying claims.

The invention claimed is:

1. A wireless power transmission apparatus to wirelessly transmit power to a wireless power receiving apparatus, the wireless power transmission apparatus comprising:

a transmission part including a transmission coil to receive the power from a power supply to generate a magnetic field, a transmission resonance coil to transmit power received therein from the transmission coil, and a plurality of repeating coils placed in the transmission resonance coil to repeat the power;

a controller for controlling the repeating coils such that one of the repeating coils has a resonance frequency equal to a resonance frequency of the transmission resonance coil; and a detection part for detecting a variation of current in the transmission part;

wherein the controller determines which one of the repeating coils is in range of communication of the wireless power receiving apparatus according to the variation of the current to transmit the power through one of the repeating coils, wherein the detection part comprises a detection coil for detecting an intensity of the magnetic field generated from the transmission resonance coil and a current detector for detecting the variation of the current by converting the magnetic field detected in the detection coil into the current, wherein the controller presets a critical value for a variation in a quantity of the current used to determine a region of the transmission part in which the wireless power receiving apparatus is positioned, wherein the controller determines which one of the repeating coils is in range of communication of the wireless power receiving apparatus based on the critical value, when the wireless power receiving apparatus is positioned on said one of the repeating coils while overlapping with another of the repeating coils, wherein a quantity of the current of said one of the repeating coils exceeds the critical value, and wherein a quantity of the current of said another of the repeating coils is less than the critical value.

2. The wireless power transmission apparatus of claim 1, wherein the controller controls the repeating coils by adjusting an impedance of each of the repeating coils.

3. The wireless power transmission apparatus of claim 1, wherein the current in the transmission part reduces if the wireless power receiving apparatus is placed on one of the repeating coils, thereby detecting the variation of the current.

4. The wireless power transmission apparatus of claim 1, wherein the controller sequentially changes one of the repeating coils among the repeating coils to detect the variation of the current corresponding to each of the repeating coils.

5. The wireless power transmission apparatus of claim 1, wherein the controller presets a critical value for comparing with the variation of the current to determine one of the repeating coils.

6. The wireless power transmission apparatus of claim 1, wherein the controller repeatedly controls the repeating coils according to a preset period of time.

7. The wireless power transmission apparatus of claim 1, wherein the repeating coils are arranged in a lattice form or in a matrix form in the transmission part.

8. The wireless power transmission apparatus of claim 1, wherein the repeating coils divide the transmission part into a plurality of uniform regions.

9. The wireless power transmission apparatus of claim 1, wherein a radius formed by the repeating coils is greater than a radius formed by a receiving resonance coil of the wireless power receiving apparatus.

10. The wireless power transmission apparatus of claim 1, wherein the repeating coils have variable capacitors, and wherein the controller controls the repeating coils by adjusting capacitance values of the variable capacitors.

11. The wireless power transmission apparatus of claim 1, wherein the repeating coils have fixed capacitors, wherein the controller controls the repeating coils by controlling switches parallel-connected to both terminals of the fixed capacitors.

12. The wireless power transmission apparatus of claim 11, wherein the controller opens a switch of one of the repeating coils and closes switches of a remainder of the repeating coils.

13. A method of wirelessly transmitting power by a wireless power transmission apparatus including a plurality of repeating coils to wirelessly transmit the power to a wireless power receiving apparatus, the method comprising:

controlling the repeating coils such that one of the repeating coils has a resonance frequency equal to a resonance frequency of the wireless power receiving apparatus;

detecting a variation of a current in the wireless power transmission apparatus;

determining which one of the repeating coils is in range of communication of the wireless power receiving apparatus according to the variation of the current;

presetting a critical value for a variation in a quantity of the current used to determine a region of the transmission part in which the wireless power receiving apparatus is positioned;

determining which one of the repeating coils is in range of communication of the wireless power receiving apparatus based on the critical value, when the wireless power receiving apparatus is positioned on said one of the repeating coils while overlapping with another of the repeating coils; and transmitting the power through one of the repeating coils, wherein a quantity of the current of said one of the repeating coils exceeds the critical value, and wherein a quantity of the current of said another of the repeating coils is less than the critical value.

14. The method of claim 13, wherein the controlling of the repeating coils sequentially changes one of the repeating coils among the repeating coils to detect the variation of the current corresponding to each of the repeating coils.

15. The method of claim 13, wherein the controlling of the repeating coils repeatedly controls the repeating coils according to a predetermined period of time.

16. The method of claim 13, wherein the current in the transmission part reduces if the wireless power receiving apparatus is placed on one of the repeating coils, thereby detecting the variation of the current.

17. The method of claim 13, wherein the repeating coils have variable capacitors, and wherein the controlling of the repeating coils adjusts capacitance values of the variable capacitors.

18. The method of claim 17, wherein the controlling of the repeating coils opens a switch of one of the repeating coils and closes switches of a remainder of the repeating coils.

19. The method of claim 13, wherein the repeating coils have fixed capacitors, and wherein the controlling of the repeating coils controls switches parallel-connected to both terminals of the fixed capacitors.

* * * * *